United States Patent Office 3,057,910
Patented Oct. 9, 1962

3,057,910
PROCESS FOR THE PRODUCTION OF N-ALKYL-O-ARYL URETHANES
Peter Fischer, Koln-Stammheim, and Johannes Pfirschke, Leverkusen, Germany, assignors to Farbenfabriken Bayer Aktiengesellschaft, Leverkusen, Germany, a corporation of Germany
No Drawing. Filed Aug. 19, 1959, Ser. No. 834,681
Claims priority, application Germany Sept. 1, 1958
4 Claims. (Cl. 260—479)

N-alkyl-O-aryl urethanes are obtainable from alkyl amines and aryl chloroformic acid esters, which in their turn can be obtained from phenols and phosgenes. In such reaction, it is necessary to have an acid acceptor. If moisture or even water is present during the reaction, then even at temperatures of 0° C., some of the chloroformic acid ester is saponified into the associated phenol. The N-alkyl-O-aryl urethanes which are formed must consequently be purified by recrystallization or in certain cases also by fractional distillation.

According to another known process, alkylamines are converted with phosgene into the carbamic acid chlorides and these are in turn reacted with aromatic hydroxy compounds in the presence of a hydrogen chloride acceptor.

Finally, N-monoalkyl-O-aryl urethanes can also be prepared from the corresponding isocyanates by reaction with phenols, but this reaction takes place very slowly. It is true that the reaction can be accelerated by adding catalysts and by raising the temperature, but it must be carried out with excess alkyl isocyanates if the corresponding urethanes are to be free from phenolic compounds. In addition, the low alkyl isocyanates are characterised by very strong lacrimatory irritation, whereas the higher members can be objectionable because of their corrosive action.

It is the object of the present invention to provide for a new process for the manufacture of N-alkyl-O-aryl urethanes. Another object is to provide for a new process to produce N-alkyl-O-aryl urethanes which avoids the disadvantages hitherto encountered in making these chemical products. Still further objects will appear hereafter.

It has been found that N-alkyl-O-aryl urethanes can be produced by simultaneously reacting together aromatic compounds having phenolic hydroxyl groups, primary or secondary alkyl amines and phosgene.

The new process provides a good yield of highly pure N-alkyl-O-aryl urethanes, and more especially free from aromatic hydroxy compounds, so that additional purifying operations can be dispensed with.

The process has the further advantage that starting from alkyl amines and aromatic hydroxy compounds in the preparation of N-alkyl-O-aryl urethanes, it is no longer necessary as heretofore to isolate intermediate products. This is especially advantageous when alkyl isocyanates with appreciable vapour pressure are to be isolated in the intermediate stage, which could render necessary involved protective measures when the process is conducted on a technical scale.

It is surprising that N,N'-substituted dialkyl ureas are not formed from monoalkyl amines and amine hydrochlorides among the products of the process.

The resulting N-alkyl-O-aryl urethanes conform to the general formula:

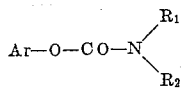

in which Ar represents an arbitrarily substituted aromatic radical, $R_1$ represents a low or higher alkyl radical, including a cycloalkyl radical, an aralkyl and an alkoxy radical, and $R_2$ represents hydrogen or an alkyl radical which is the same as or different from $R_1$. $R_1$ and $R_2$ can also be closed to form a cycloaliphatic ring, which ring may be interrupted by hetero atoms.

Aromatic compounds with phenolic hydroxyl groups which can be employed as starting materials in the new process include for example phenol, α-naphthol, β-naphthol, 2-oxy diphenyl, 4-oxy diphenyl, 4-oxy diphenyl methane, 4-oxy diphenyl dimethyl methane, 4-oxy pyridine, o-cresol, m-cresol, p-cresol, o-nitro phenol, m-nitro phenol, p-nitro phenol, 2-methyl-6-chlorophenol, 2-methyl-4,6-dichlorophenol, 4-tert. butyl phenol, 4-bromophenol, 4-ethoxy-3-nitro phenol, 2,3,5-trimethyl phenol, 2-isopropyl phenol, 4-dodecyl phenol, 2-ethyl phenol, 2-ethyl-α-naphthol, 2-chloro-α-naphthol, 3-bromo-4-oxy diphenyl, 5-bromo-2-oxy diphenyl.

Examples of primary and secondary amines are methyl amine, ethyl amine, propyl amine, n-butyl amine, isobutyl amine, dodecyl amine, stearyl amine, cyclohexyl amine, benzyl amine, 3-methoxy propyl amine, 3-lauryl oxypropyl amine, dimethyl amine, diethyl amine, methyl ethyl amine, methyl stearyl amine, ethyl cyclohexyl amine, methyl benzyl amine, 3-methoxy propyl methyl amine, piperidine, and morpholine.

The phenol, the amine and the phosgene are reacted together simultaneously. It is preferred to add the amine to the phenol in the form of gas, liquid or in solution. The phosgene is preferably added at the same time also in the form of a gas or liquid or in solution. It is also possible to combine the phenol and phosgene under pressure and then to add the amine.

The quantities of amine and phenol introduced are to conform to the quantities which are theoretically necessary. However, in order to completely react the phenolic component it is frequently advisable to use an excess of amine of up to 50 mol percent. The phosgene will usually be used in an excess over the amine of up to 50 mol percent.

The reaction is performed in an inert organic solvent. The following solvents may be mentioned as examples: toluene, chlorobenzene, o-dichlorobenzene, benzine, nitro benzene, xylene, p-cymol, p-toluene sulfofluoride.

The reaction is carried out at elevated temperature. The most of the possible combinations of starting materials will react at a sufficient reaction rate within the temperature range from 80 to 180° C. The preferred temperature range is between 110 and 140° C.

It is possible but not necessary to accelerate the reaction by means of catalysts such as tert. amines. For instance, triethyl amine, dimethyl aniline, or dimethylcyclohexylamine can be used in an amount of 0.5–1% by weight of phenol. The reaction material is worked up in the usual manner for isolating the N-alkyl-O-aryl urethane which is formed. For example, the reaction mixture can be concentrated by distillation, perhaps under reduced pressure. Phosgene and alkyl carbamic acid chloride or alkyl isocyanate thereby distilled off can be added to a fresh batch and thus contribute to reducing the consumption of alkyl amine and phosgene. From the concentrate, the N-alkyl-O-aryl urethane normally crystallizes out after cooling with a high degree of purity, and practically free from residual phenolics and hydrochlorides. The product of the process can for example be separated by filtration or centrifuging from the mother liquor and dried in vacuo. The total yield generally reaches 80% and higher, calculated on the phenolic compound introduced.

The unreacted starting materials can be recovered from the mother liquor by decomposition with dilute caustic alkali solution, whereby the yield based on the conversion is substantially improved.

The N-alkyl-O-aryl urethanes are known as very effective insecticides, fungicides and acaricides. Data on their effectiveness are given for instance in the German Patents 956,638 and 961,042.

Figures on laboratory and field tests are given in Journal of Economic Entomology, vol. 51, 1958, pp. 236 to 239. Comparative tests on a great number of derivatives of N-alkyl-O-aryl urethanes are summarized in the French Patent 1,166,551.

*Example 1*

144 parts by weight of α-naphthol are dissolved in 2200 parts by weight of chlorobenzene and heated to 130° C. Phosgene and methylamine are simultaneously introduced in gaseous form into the solution through separate supply pipes. The flow velocity is such that 40 parts by weight of methylamine and 240 parts by weight of phosgene are used up after 2 hours. The reaction mixture is thereafter concentrated by distillation to 400 parts by weight. On cooling, coarse-grain crystals separate out from the concentrated solution, which crystals are separated from the mother liquor and dried in vacuo for 2 hours. Yield of N-methyl-O-α-naphthyl urethane is 130 parts by weight= 64.6% of the theoretical, based on the α-naphthol introduced. M.P. 144° C. N calculated 6.97%. Found 7.00%.

24 parts by weight of phosgene and 9.2 parts by weight of methyl carbamic acid chloride are found in the chlorobenzene which is distilled off.

From the mother liquor, it is possible to recover 2.2 parts by weight of methylamine by heating with 2N caustic soda solution, and 38 parts by weight of α-naphthol can be recovered after acidification with hydrochloric acid and extraction with chlorobenzene. The yield of N-methyl-O-α-naphthyl urethane, calculated on the conversion of α-naphthol, is consequently 87.9%.

*Example 2*

45 parts by weight of methylamine and 480 parts by weight of phosgene are introduced at 125° C. and in a period of 5 hours into a solution of 129 parts by weight of p-chlorophenol in 2200 parts by weight of chlorobenzene. The solution which is obtained is concentrated by distilling off the solvent. After cooling, 138 parts by weight of N-methyl-O-p-chlorophenyl urethane with a melting point 155° C. crystallise out, this corresponding to a yield of 74.2% of the theoretical.

N calculated, 7.55; found, 7.42.
Cl calculated, 19.15; found, 19.6.

*Example 3*

150 parts by weight of cyclohexylamine (dissolved in 900 parts by weight of chlorobenzene) are introduced dropwise within 4 hours into a solution of 108 parts by weight of p-cresol in 1300 parts by weight of chlorobenzene, the solution being heated to 125° C. At the same time, a total of 440 parts by weight of gaseous phosgene are introduced. After concentrating the solution, N-cyclohexyl-o-p-methyl phenyl urethane crystallises out, this being separated from the mother liquor, washed with 100 parts by weight of n-hexane and dried in vacuo.

Yield: 182 parts by weight, corresponding to 78% of the theoretical.

M.P. 152° C.; N calc., 6.02%; found, 6.02%.

*Example 4*

As described in Example 3, 100 parts by weight of diethylamine in 900 parts by weight of chlorobenzene and 500 parts by weight of phosgene are introduced into a solution of 94 parts by weight of phenol in 1300 parts by weight of chlorobenzene. The solution is worked up by distillation under reduced pressure. In the main fraction, N,N-diethyl-O-phenyl urethane distills over as colourless oil with a boiling point of 120° C./0.1 mm. Hg. Yield 157 parts by weight, corresponding to 81.5% of the theoretical.

N. calc., 7.25; found, 7.00.

*Example 5*

110 parts by weight of o-isopropyl phenol are heated in 1620 parts by weight of chlorobenzene to 120° C. 0.8 parts by weight of triethyl amine are added to the solution. Into the heated mixture 142 parts by weight of phosgene and 21 parts by weight of methyl amine are added separately within two hours. The residual phosgene is removed by a stream of nitrogen and the reaction mixture concentrated. On cooling, 56.5 parts by weight of O-o-isopropyl phenyl-N-methyl urethane crystallizes out. Melting point 93–94° C.

From the mother liquor it is possible to recover 29 parts by weight of o-isopropyl phenol and 39 parts by weight of raw urethane which when recrystallized from ligroin yield 28 parts by weight of the pure urethane. Total yield 84.5 parts by weight of O-o-isopropylphenol-N-methyl urethane corresponding to a yield of 73.7% of the theoretical.

It is understood that any suitable phenol as hereinbefore disclosed my be substituted in any of the above examples and that any suitable primary or secondary amine as hereinbefore described may likewise be substituted in any of the foregoing examples.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What we claim is:

1. A process for the production of N-alkyl-O-aryl urethanes which comprises simultaneously reacting in an inert organic solvent at a temperature of from 80°–180° C. phosgene and a member selected from the group consisting of primary and secondary amines with an organic compound containing a phenolic hydroxy group.

2. A process for the production of N-methyl-O-α-naphthyl urethane which comprises simultaneously reacting together phosgene and methylamine with α-naphthol in an inert organic solvent at a temperature of 80°–180° C.

3. A process for the production of N-methyl-O-o-isopropyl phenyl urethane which comprises simultaneously reacting together phosgene and methyl amine with o-isopropyl phenol in an inert organic solvent at a temperature of 80°–180° C.

4. A process for the production of N-alkyl-O-aryl urethanes of the formula

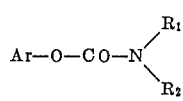

in which Ar represents an aromatic radical, $R_1$ is selected from the group consisting of alkyl, cycloalkyl, aralkyl, and alkoxy, $R_2$ is selected from the group consisting of hydrogen and an alkyl radical, and $R_1$ and $R_2$ can also be closed to form a cycloaliphatic ring, which ring may be interrupted by heteroatoms, said process comprising simultaneously reacting together phosgene and an amine of the formula

with a phenol of the formula ArOH; $R_1$, $R_2$ and Ar being the same as above, said process being conducted at a temperature in the range of 80°–180°– C.

References Cited in the file of this patent

UNITED STATES PATENTS 2,854,374    Huisman et al. _____ Sept. 30, 1958
2,903,478    Lambrech _____ Sept. 8, 1959